United States Patent
Briggs

(10) Patent No.: US 9,956,629 B2
(45) Date of Patent: May 1, 2018

(54) TITANIUM ALLOY FOR FASTENER APPLICATIONS

(71) Applicant: The Boeing Company, Chicago, IL (US)

(72) Inventor: Robert D. Briggs, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 211 days.

(21) Appl. No.: 14/327,984

(22) Filed: Jul. 10, 2014

(65) Prior Publication Data

US 2016/0008903 A1    Jan. 14, 2016

(51) Int. Cl.
   C22C 14/00   (2006.01)
   B23G 7/00    (2006.01)
   C22F 1/18    (2006.01)
   C22C 1/00    (2006.01)

(52) U.S. Cl.
   CPC ............ *B23G 7/00* (2013.01); *C22C 1/00* (2013.01); *C22C 14/00* (2013.01); *C22F 1/183* (2013.01)

(58) Field of Classification Search
   CPC .............................. C22C 14/00; C22F 1/183
   USPC ............................................ 420/417
   See application file for complete search history.

(56) References Cited

U.S. PATENT DOCUMENTS

| | | | |
|---|---|---|---|
| 2,554,031 A | 5/1951 | Jaffee et al. | |
| 2,754,204 A | 7/1956 | Jaffee et al. | |
| 2,821,475 A | 1/1958 | Jaffee et al. | |
| 2,906,654 A | 9/1959 | Abkowitz | |
| 5,332,545 A | 7/1994 | Love | |
| 2003/0086772 A1 | 5/2003 | Glannokakas | |
| 2008/0181809 A1* | 7/2008 | Vladislav | C22C 1/02 420/420 |
| 2011/0268602 A1 | 11/2011 | James et al. | |
| 2012/0076612 A1 | 3/2012 | Bryan | |
| 2013/0174944 A1* | 7/2013 | Wright | C22C 1/02 148/557 |
| 2014/0271336 A1* | 9/2014 | Colombo | C22C 14/00 420/420 |

FOREIGN PATENT DOCUMENTS

| | | |
|---|---|---|
| CN | 1653199 A | 8/2005 |
| CN | 102834537 A | 12/2012 |
| CN | 102939398 A | 2/2013 |
| CN | 103097560 A | 5/2013 |
| WO | WO2013162658 A2 | 10/2013 |

OTHER PUBLICATIONS

SAE Aerospace, "Titanium Alloy Sheet, Strip, and Plate 6Al-4V Solution Heat Treated and Aged," SAE International, Jun. 2011, 7 pages.

(Continued)

*Primary Examiner* — Jie Yang
(74) *Attorney, Agent, or Firm* — Yee & Associates, P.C.

(57) ABSTRACT

A method and apparatus for forming a fastener for an aircraft. An annealed titanium alloy is provided with about 5.50 to about 6.75 weight percent aluminum, about 3.50 to about 4.50 weight percent vanadium, more than 0.20 weight percent oxygen, and more than 0.30 weight percent iron. Operations are performed to form the fastener for the aircraft from the annealed titanium alloy.

16 Claims, 7 Drawing Sheets

(56) References Cited

OTHER PUBLICATIONS

National Aerospace Standards Committee, "Fastener, 6Al-4V Titanium Alloy, Externally Threaded, 160 KSI Ftu, 95 KSI Fsu, 450° F.," Aerospace Industries Association of America, Inc., 2012, 21 pages.
Federal Institute of Industrial Property Office Action, dated Aug. 11, 2016, regarding Application No. 2015108847/02, 20 pages.
"ATI 425 Alloy", ATI, © 2016, Technical Data Sheet, Version2, Aug. 16, 2010, 2 pages. www.atimetals.com/products/425-alloy/Applications.
Extended European Search Report, dated Nov. 30, 2015, regarding Application No. EP15170414.5, 8 pages.
"TIMET Al 6-4, 6-4 ELI & 6-4.1R u," TIMET, Jan. 1, 2000, http://www.timet.com/images/document/datasheets/alphaandbetaalloys/6-4.pdf.
Federal Institute of Industrial Property Office Action and English Translation, dated Dec. 16, 2016, regarding Application No. 2015108847/02, 17 pages.
European Patent Office Communication, dated Mar. 23, 2017, regarding Application No. EP15170414.5, 5 pages.
State Intellectual Property Office of the PRC First Notification of Office Action, dated Jan. 17, 2018, regarding U.S. Appl. No. 201510172372.7, 15 pages.
Song, "The Application Status Quo of the Titanium Alloys in Automobile Components and Their Research Tendency", University of Science and Technology, Beijing, China, 2007, 1 page. Abstract Only.

* cited by examiner

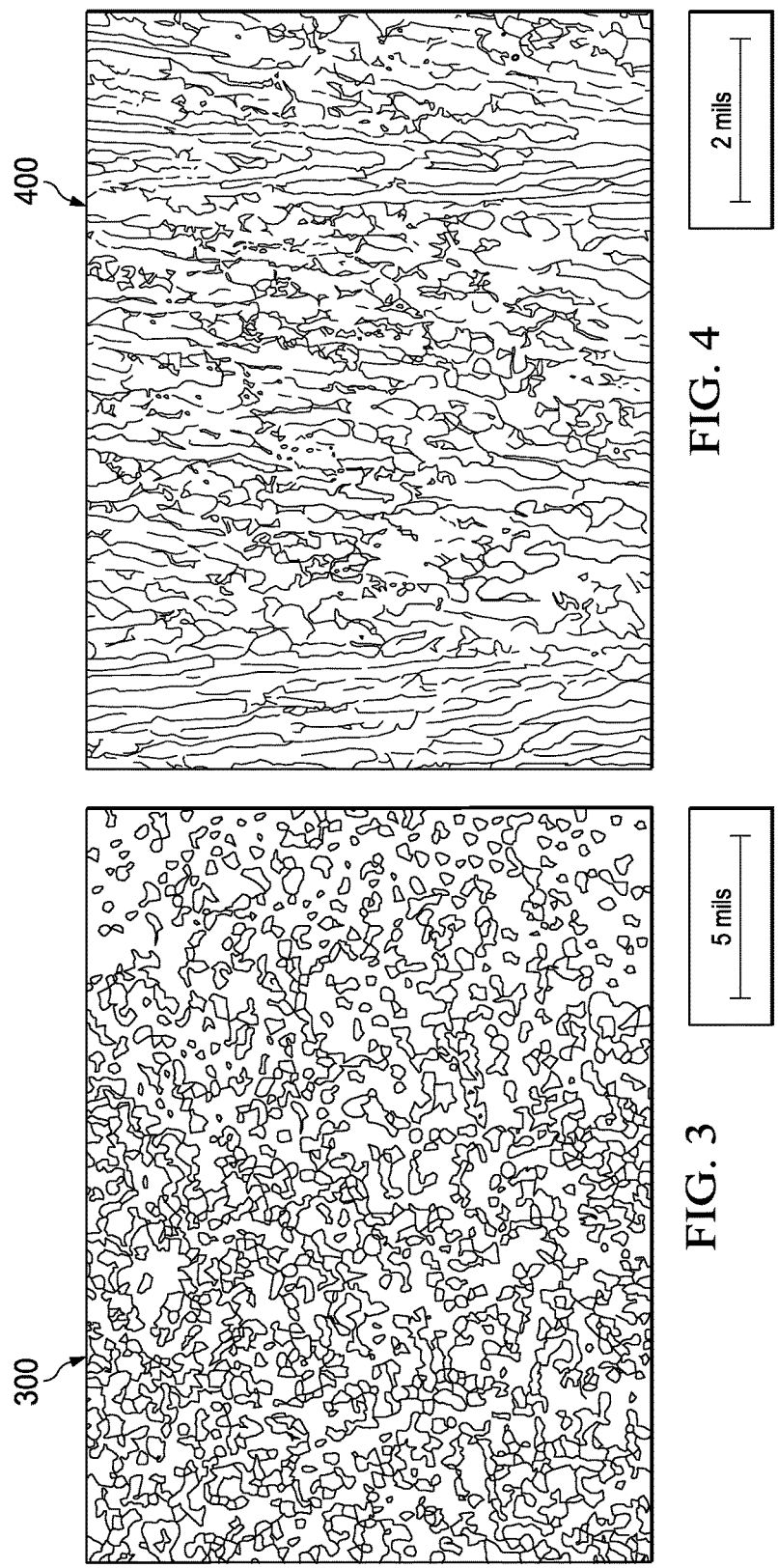

TITANIUM ALLOY FOR FASTENER APPLICATIONS

BACKGROUND INFORMATION

1. Field

The present disclosure relates generally to titanium alloy and, in particular, to processing titanium alloy to have desired mechanical properties. Still more particularly, the present disclosure relates to a method and apparatus for forming fasteners from titanium alloy with desired mechanical properties.

2. Background

Titanium alloys are metals that comprise a mixture of titanium with other chemical elements. Titanium alloys have a high strength-to weight ratio, are corrosion resistant, and exhibit higher tensile strength and toughness than other materials, even at increasing temperatures. For these reasons, titanium alloys are often used in aerospace and aeronautical applications. For example, without limitation, titanium alloy is used to form landing gear components, engine components, mechanical fasteners, and other suitable structures.

Typically, titanium parts for aerospace applications are formed from Ti-6Al-4V alloy, which is an alpha-beta titanium alloy comprised of about six percent weight aluminum, about four percent weight vanadium, other elements in small quantities, and the balance is titanium. Aerospace industry standards mandate that parts formed from titanium alloy, such as Ti-6Al-4V, have certain material properties. For instance, the standards mandate that aerospace fasteners must have a certain amount of shear strength and tensile strength to be used in aircraft.

To achieve these material properties, certifying bodies establish chemical composition and processing guidelines for fasteners made of titanium alloy. For example, current aerospace guidelines require Ti-6Al-4V to be formed with a maximum amount of oxygen, iron, carbon, and nitrogen. Further, the standards advocate using a solution treating and age process to improve the shear strength and tensile strength of a fastener made from the titanium alloy.

During a solution treating and age process, material is placed in a furnace for the solution treatment, quenched, cleaned, and then aged to strengthen the material. This process may take several hours and require bulky machinery that takes up valuable manufacturing space. The heat treat process creates surface contamination, which makes the surface brittle and needs to be removed. Consequently, this process takes more time and uses more resources than desired.

In addition, as the thickness of the solution treated and aged material increases, the ability of the material to maintain a desired shear strength and tensile strength decreases. As a result, solution treated and aged fasteners with a larger diameter may not perform as well as desired.

Therefore, it would be desirable to have a method and apparatus that take into account at least some of the issues discussed above, as well as other possible issues. Specifically, it would be desirable to provide a lightweight titanium alloy material for aerospace fasteners that meets industry requirements, while saving time and cost of manufacture.

SUMMARY

Embodiments of the disclosure present a method and apparatus for forming a titanium alloy fastener from fastener stock having desired material properties. The fastener is formed from fastener stock having more than 0.20 weight percent oxygen and more than 0.30 weight percent iron. Specifically, the illustrative embodiments disclose a fastener having about 5.50 to about 6.75 weight percent aluminum, about 3.50 to about 4.50 weight percent vanadium, about 0.25 to about 0.50 weight percent oxygen, and about 0.40 to about 0.80 weight percent iron.

The amount of oxygen and iron within the titanium alloy has been increased beyond aerospace industry maximums of 0.20 and 0.30 weight percent, respectively. The composition of oxygen and iron within the illustrative embodiments achieves the required ultimate tensile strength and shear strength for aerospace fasteners, without using a solution treat and age process on the fastener.

Eliminating the need for solution treatment and aging saves countless manufacturing hours, which translates to faster production of fasteners while reducing the cost per fastener. Manufacturing fastener stock with higher levels of oxygen and iron allows ingot manufacturers to use greater percentages of scrap material rich in both elements in the ingot formulation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of the microstructure of a solution treated and aged titanium alloy in accordance with an illustrative embodiment;

FIG. 4 is an illustration of the microstructure of an annealed titanium alloy in accordance with an illustrative embodiment;

DETAILED DESCRIPTION

The illustrative embodiments recognize and take into account one or more different considerations. For example, the illustrative embodiments recognize and take into account that it may be desirable to increase the production rate of aerospace fasteners while maintaining desired material properties for the fasteners. For example, the illustrative embodiments recognize and take into account that industry standards require aerospace fasteners made from Ti-6Al-4V titanium alloy to have a tensile strength of 160 ksi (kilopounds per square inch) and a shear strength of 95 ksi when the fastener has a diameter of 0.625 inches or below. Further, the standards require fasteners having a diameter of over 0.625 inches to have a tensile strength of 150 ksi and a shear strength of 90 ksi. The illustrative embodiments recognize the need to meet such standards while reducing the number of costly, time-consuming processing steps used to strengthen traditional Ti-6Al-4V alloy.

The illustrative embodiments further recognize and take into account that it may be desirable to form fasteners from titanium alloy using hot rolling, coating, and other heat-induced techniques. For example, fastener threads may be formed using a hot rolling process. The illustrative embodiments recognize and take into account, however, that using a solution treating and aging process on the material may limit the manner in which fasteners may be formed from the titanium alloy. For instance, solution treated and aged material may have a maximum processing temperature limit. This maximum processing temperature limit makes some hot rolling processes infeasible.

In addition, the illustrative embodiments recognize and take into account that it may be desirable to form fastener stock material from scrap material. Because scrap material contains higher levels of oxygen than previously desired, the ability to recycle material to form fastener stock was limited. The illustrative embodiments recognize and take into account that increasing the amount of scrap material used to form fastener stock reduces the cost of raw materials and also reduces waste.

Thus, the illustrative embodiments provide a method and apparatus for manufacturing a titanium alloy. Further, the illustrative embodiments present a method and apparatus for forming a fastener from the titanium alloy. An apparatus comprises a fastener used in an aircraft. The fastener includes a titanium alloy comprising about 5.50 to about 6.75 weight percent aluminum, about 3.50 to about 4.50 weight percent vanadium, about 0.25 to about 0.50 weight percent oxygen, and 0.40 to about 0.80 weight percent iron.

Figure 1:
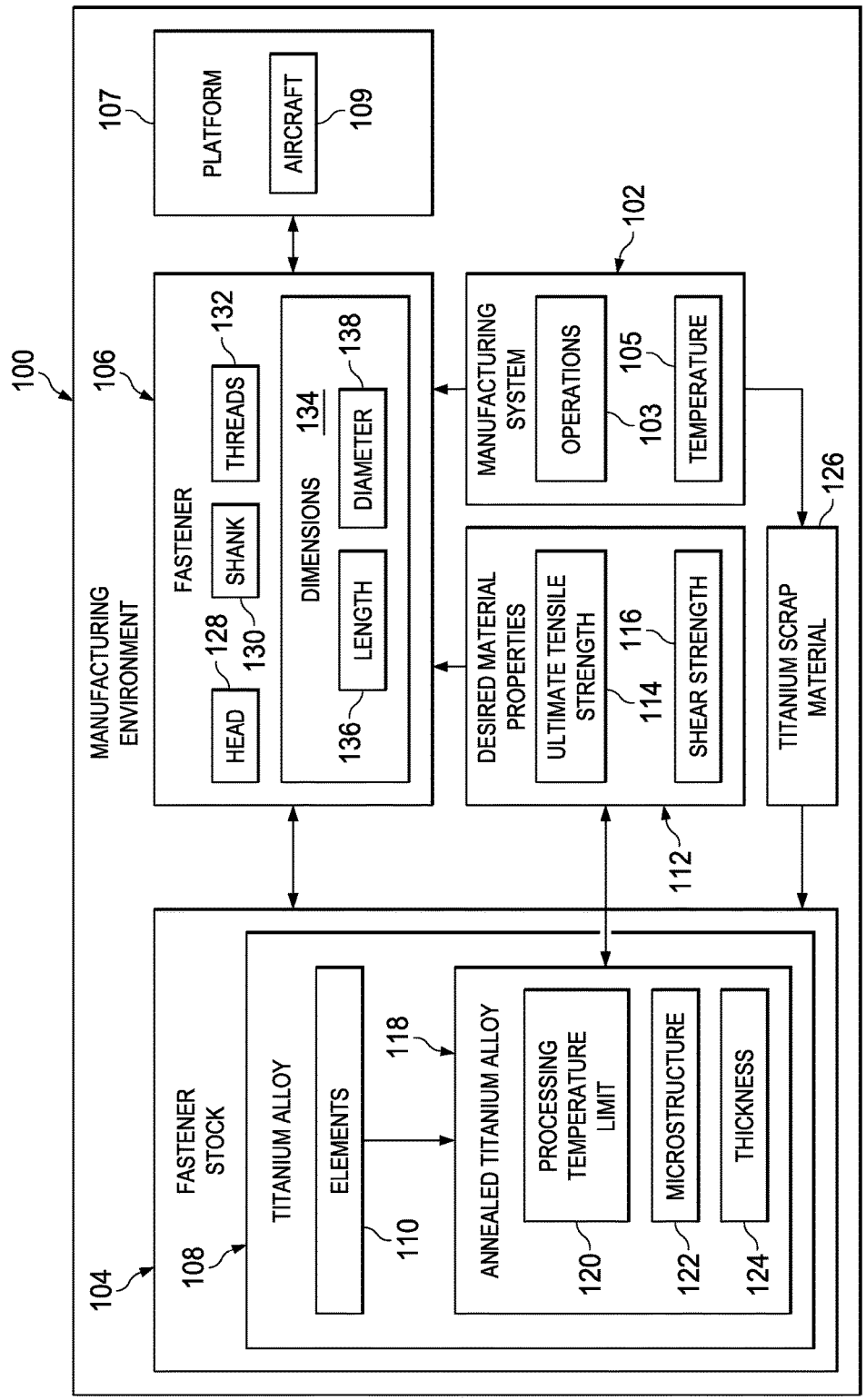
FIG. 1 is an illustration of a block diagram of a manufacturing environment in accordance with an illustrative embodiment.

Referring now to the figures and, in particular, with reference to FIG. 1, an illustration of a block diagram of a manufacturing environment is depicted in accordance with an illustrative embodiment. In this illustrative example, manufacturing system 102 within manufacturing environment 100 is used to manufacture fastener stock 104 for fastener 106. Manufacturing system 102 also may be used to form fastener 106 from fastener stock 104.

As depicted, manufacturing system 102 may include a number of components configured for use in forming at least one of fastener stock 104 or fastener 106. As used herein, a "number of" items may be one or more items. Thus, a number of components is one or more components.

Examples of components in manufacturing system 102 may include a cooling system, a heating system, a shape forming system, a controller, an inspection system, a cutting system, a press, and other suitable systems. These components may be computer controlled, manually operated by a human operator, or some combination thereof.

As illustrated, manufacturing system 102 may perform operations 103 to form fastener 106. Operations 103 may be performed at temperature 105. Temperature 105 may change based on the type of operations 103 performed to form fastener 106.

As used herein, the term "fastener" refers to a hardware device that mechanically joins or affixes two or more structures together. For example, fastener 106 may join two or more structures together in platform 107. Fastener 106 includes, for example, without limitation, a bolt, a nut, a stud, a screw, a rivet, a washer, a lock washer, and other suitable elements. Platform 107 may take the form of aircraft 109 in this illustrative example.

As used herein, "fastener stock" refers to a material that is processed to form one or more fasteners from the article. For instance, fastener stock 104 may be forged to form fastener 106.

Fastener stock 104 comprises metal in this illustrative example. Specifically, fastener stock 104 comprises titanium alloy 108. Fastener 106 used in aircraft 109 comprises titanium alloy 108 when formed from fastener stock 104.

Titanium alloy 108 is a material comprising elements 110 in this illustrative example. Elements 110 may include titanium and at least one of aluminum, vanadium, iron, oxygen, carbon, nitrogen, hydrogen, chromium, yttrium, molybdenum, zirconium, nickel, niobium, manganese, cobalt, niobium, or other suitable elements.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, titanium alloy 108 has more than 0.20 percent weight oxygen and more than 0.30 percent weight iron. In an illustrative example, titanium alloy 108 comprises about 5.50 to about 6.75 weight percent aluminum, about 3.50 to about 4.50 weight percent vanadium, about 0.25 to about 0.50 weight percent oxygen, and 0.40 to about 0.80 weight percent iron. In some illustrative examples, titanium alloy 108 has about 0.25 to about 0.30 weight percent oxygen and about 0.40 to about 0.60 percent weight iron. Titanium alloy 108 also may comprise about 0.005 to about 0.20 weight percent molybdenum and about 0.03 to about 0.15 weight percent chromium. The balance of titanium alloy 108 includes titanium and other suitable elements.

Titanium alloy with similar aluminum and vanadium content may be referred to as Ti-6Al-4V. Ti-6Al-4V material used in aerospace applications must have desired material properties 112. Desired material properties 112 include ultimate tensile strength 114, shear strength 116, and other suitable properties in this illustrative example.

In an illustrative example, ultimate tensile strength 114 represents the maximum stress that a material can withstand while being stretched or pulled before failure. Shear strength 116 represents the ability of a material to withstand a load in a direction parallel to the face of the material. As used herein, the terms "ultimate tensile strength," ("UTS"), and "tensile strength" may be used interchangeably.

Minimum requirements for tensile strength and shear strength for fasteners used in aerospace applications may be set forth by aerospace governing bodies, agencies, manufacturers, or a combination thereof. For example, some tensile strength and shear strength requirements are set forth in the National Aerospace Standards (NAS) established by the Aerospace Industries Association (AIA). National Aerospace Standards require a fastener having a diameter of less than 0.625 inches to have an ultimate tensile strength of 160 ksi and a shear strength of 95 ksi.

In addition, manufacturer standards may require larger fasteners, those over 0.625 inches, to have a desired tensile strength and shear strength value. For example, in some cases, an ultimate tensile strength of 150 ksi and a shear strength of 90 ksi may be desired when the fastener is over 0.625 inches. In other illustrative examples, other values for ultimate tensile strength 114 and shear strength 116 may be desired, depending on the functionality involved.

To achieve desired material properties 112, the National Aerospace Standards set forth engineering requirements that Ti-6Al-4V material comprise a maximum 0.20 weight percent oxygen content and 0.30 weight percent iron content. The illustrative examples have an increased iron and oxygen content that is above the typical Ti-6Al-4V material set forth in the standards. Increasing the oxygen and iron content of titanium alloy 108 increases the strength of the material.

In this illustrative example, titanium alloy 108 is annealed to form annealed titanium alloy 118. Annealing is a heat treatment that alters the physical and often the chemical properties of a material to increase its ductility. Annealing may include heating the material above its critical temperature, maintaining that temperature for a period of time, and then cooling. Annealing may induce ductility, soften the material, relieve internal stresses, homogenize the structure of the material, improve cold working properties, and so forth. In this illustrative example, titanium alloy 108 is annealed to change its material properties before being used as fastener stock 104.

As depicted, annealed titanium alloy 118 may have processing temperature limit 120. Processing temperature limit 120 may be a limit on temperature 105 at which operations 103 are performed to form fastener 106. In other words, when heat-induced operations 103 are performed, those operations must not heat annealed titanium alloy 118 above processing temperature limit 120. Otherwise, desired material properties 112 may be altered. In this depicted example, processing temperature limit 120 may be about 1,400 degrees Fahrenheit.

Annealed titanium alloy 118 has microstructure 122 in this illustrative example. Microstructure 122 represents the fine structure of a material at a prescribed level of magnification. Microstructure 122 influences the physical properties of annealed titanium alloy 118 including strength, toughness, ductility, hardness, corrosion resistance, temperature behavior, and wear resistance, among other properties. Microstructure 122 shows the configuration of alpha phase and beta phase titanium alloy in annealed titanium alloy 118.

Annealed titanium alloy 118 has thickness 124 in this depicted example. Annealed titanium alloy 118 may behave differently at different thicknesses. For example, a thinner piece of annealed titanium alloy 118 may have a higher ultimate tensile strength 114 than a thicker material. Other properties of annealed titanium alloy 118 also may be different depending on thickness 124. In some cases, material properties of different thicknesses of the material may be substantially the same.

In an illustrative example, titanium alloy 108 is formed from various materials. These materials may include titanium sponge, master alloy, and titanium scrap material 126 of suitable composition. Titanium scrap material 126 may include Ti-6Al-4V scrap, as well as scrap from other titanium alloys such as Ti-10V-2Fe-3Al and Ti-5Al-5Mo-5V-3Cr. In some cases, fifty percent of titanium alloy 108 may be comprised of titanium scrap material 126. In other examples, at least seventy percent of titanium alloy 108 is comprised of titanium scrap material 126.

Once titanium alloy 108 has been formed and annealed, fastener 106 may be formed from fastener stock 104. Specifically, operations 103 may be performed to form head 128, shank 130, and threads 132 for fastener 106. Fastener 106 will have the same desired material properties 112 as fastener stock 104, as no additional processes are used to alter the properties of fastener 106 during operations 103. In other words, since fastener stock 104 with annealed titanium alloy 118 has a 160 ksi tensile strength and a 95 ksi shear strength, fastener 106 will have those material properties as well.

Fastener 106 may have dimensions 134 when completed. Dimensions 134 may include length 136 and diameter 138. Diameter 138 may represent the diameter of shank 130 in this illustrative example. The process of forming fastener 106 does not include solution treating and aging. Rather, fastener 106 formed from annealed titanium alloy 118 exhibits desired material properties 112 such that solution treating and aging is unnecessary.

The illustration of fastener stock 104 and fastener 106 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Although the illustrative examples are described with respect to an aircraft, an illustrative embodiment may be applied to other types of platforms. The platform may be, for example, without limitation, a mobile platform, a stationary platform, a land-based structure, an aquatic-based structure, and a space-based structure.

More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms. Fastener 106 may be applicable to any of the above-mentioned platforms that require tensile strength and shear strength as provided by titanium alloy 108 with an increased oxygen and iron content.

Figure 2:
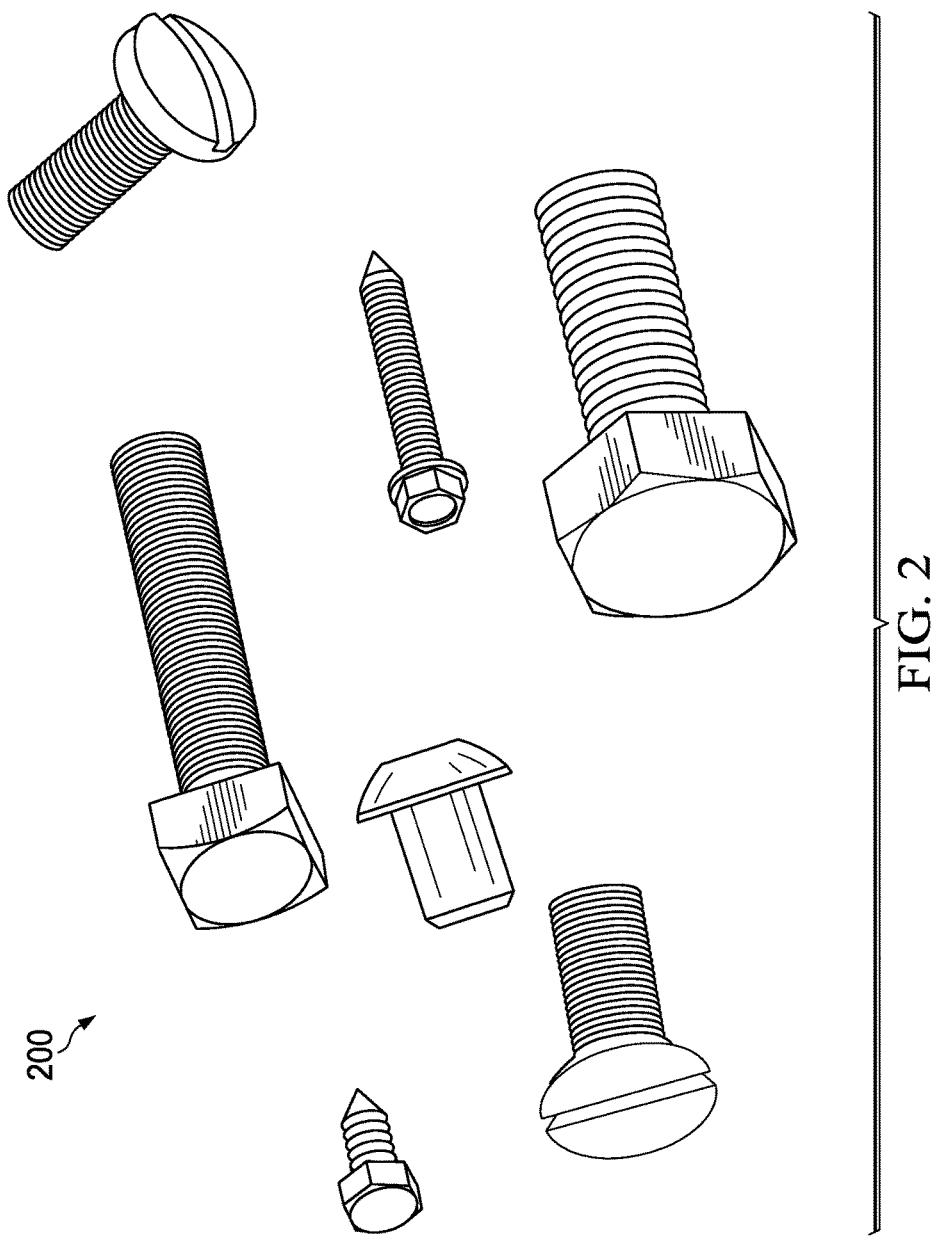
FIG. 2 is an illustration of a plurality of fasteners in accordance with an illustrative embodiment.

With reference now to FIG. 2, an illustration of a plurality of fasteners is depicted in accordance with an illustrative embodiment. In this depicted example, fasteners 200 include various types of fasteners. Each one of fasteners 200 is an example of a physical implementation for fastener 106 shown in block form in FIG. 1.

As shown, fasteners 200 may have varying diameters. Fasteners 200 are comprised of titanium alloy fastener stock in accordance with an illustrative embodiment. Specifically, each of fasteners 200 include about 5.50 to about 6.75 weight percent aluminum, about 3.50 to about 4.50 weight percent vanadium, about 0.25 to about 0.50 weight percent oxygen, and 0.40 to about 0.80 weight percent iron. As a result, each of fasteners 200 meets industry standards for tensile strength and shear strength, regardless of diameter.

FIG. 3 and FIG. 4 compare the microstructure of a solution treated and aged titanium alloy and an annealed titanium alloy in accordance with an illustrative embodiment. FIG. 3 is an illustration of the microstructure of a solution treated and aged titanium alloy, while FIG. 4 is an illustration of the microstructure of the annealed titanium alloy with oxygen content above about 0.25 weight percent and iron content above about 0.40 weight percent.

FIG. 3 shows microstructure 300. Microstructure 300 represents Ti-6Al-4V with oxygen content at or below the industry maximum of 0.20 weight percent and 0.30 weight percent, respectively in the solution treated and aged condition. Microstructure 300 comprises primary alpha in a matrix of aged martensite.

FIG. 4 shows microstructure 400. In this illustrative example, microstructure 400 is the microstructure of titanium alloy with about 0.25 weight percent oxygen and about 0.40 percent iron.

Microstructure 400 represents the modified Ti-6Al-4V titanium alloy with oxygen and iron content above industry maximums and in the annealed condition. Microstructure 400 comprises equiaxed and elongated alpha phase in a transformed beta matrix. The strength of both the alpha phase and the beta phase has increased in the Ti-6Al-4V titanium alloy via the oxygen and iron content increase. An increase in oxygen content increases the strength of the alpha phase, while an increase in iron content increases the strength of the beta phase.

Increasing both elements within the titanium alloy maintains a strength balance of alpha and beta phases in the material. In other words, if only one element had been increased while keeping the other element the same, a differential in the alpha and beta phase strength would be created. This differential may produce a weakness in the material and the overall strength may not increase as desired. For example, had only oxygen been increased beyond the maximum, the strength of the alpha phase would be increased but not the strength of the beta phase, making the beta phase the weak link in the structure. As a result, the titanium alloy may not perform as desired.

Figure 5:
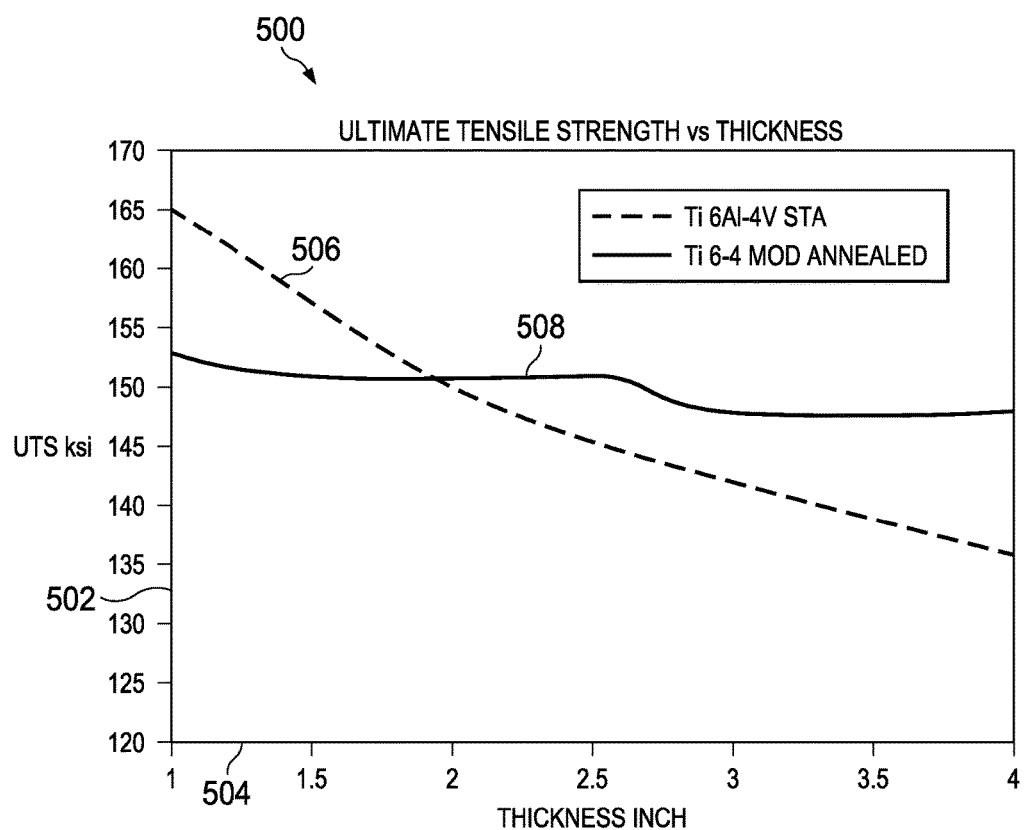
FIG. 5 is a graph of ultimate tensile strength of two types of materials in accordance with an illustrative embodiment.

With reference next to FIG. 5, a graph of ultimate tensile strength of two types of materials is depicted in accordance with an illustrative embodiment. In this depicted example, graph 500 has x-axis 502 and y-axis 504. X-axis 502 represents ultimate tensile strength in ksi and y-axis 504 represents thickness in inches. Thickness values are shown between 1.0 inch and 4.0 inches in this illustrative example.

As shown, line 506 shows the ultimate tensile strength of solution treated and aged Ti-6Al-4V material having less than 0.20 weight percent oxygen and less than 0.30 weight percent iron. Line 506 shows the tensile strength as the thickness of the material increases. This thickness may be the thickness of a bar of fastener stock. In a similar fashion, line 508 shows the ultimate tensile strength of annealed titanium alloy material in accordance with an illustrative embodiment.

In this depicted example, the ultimate tensile strength of solution treated and aged Ti-6Al-4V drops consistently as the thickness of the material increases. The annealed titanium alloy with increased oxygen and iron content, on the other hand, has an ultimate tensile strength that remains substantially the same as the thickness of the titanium alloy increases from about 1.0 inch to about 4.0 inches.

Figure 6:
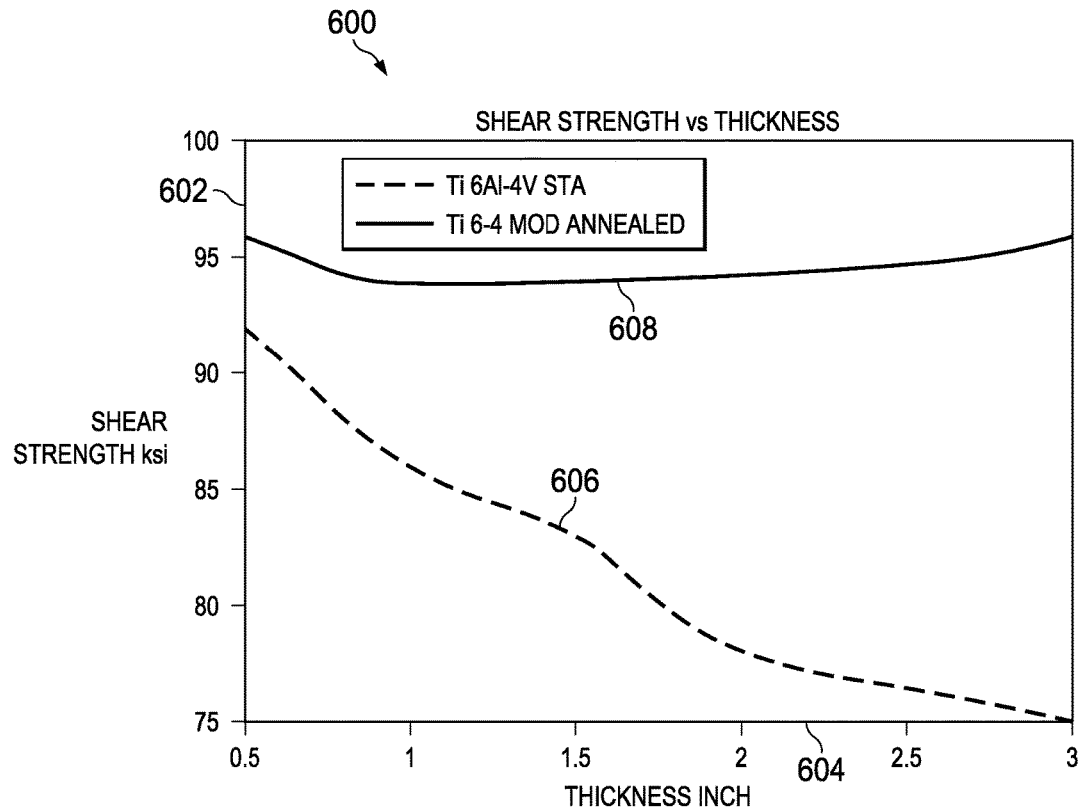
FIG. 6 is a graph of shear strength of two types of materials in accordance with an illustrative embodiment.

FIG. 6 is a graph of shear strength of two types of materials depicted in accordance with an illustrative embodiment. In this depicted example, graph 600 has x-axis 602 and y-axis 604. X-axis 602 represents shear strength in ksi and y-axis 604 represents thickness in inches. Thickness values are shown between 0.5 inches and 3.0 inches in this illustrative example.

As shown, line 606 shows the shear strength of solution treated and aged Ti-6Al-4V material having less than 0.20 weight percent oxygen and less than 0.30 weight percent iron. Line 606 shows the shear strength as the thickness of the material increases. This thickness may be the thickness of a bar of fastener stock. In a similar fashion, line 608 shows the shear strength of annealed titanium alloy material in accordance with an illustrative embodiment.

In this depicted example, the shear strength of solution treated and aged Ti-6Al-4V drops consistently as the thickness of the material increases. The annealed titanium alloy with increased oxygen and iron content, on the other hand, has an ultimate tensile strength that remains substantially the same as the thickness of the titanium alloy increases from about 0.5 inches to about 3.0 inches.

The illustrations in FIGS. 2-6 are not meant to imply physical or architectural limitations to the manner in which an illustrative embodiment may be implemented. Other components in addition to or in place of the ones illustrated may be used. Some components may be optional.

The different components shown in FIGS. 2-6 may be illustrative examples of how components shown in block form in FIG. 1 can be implemented as physical structures. Additionally, some of the components in FIGS. 2-6 may be combined with components in FIG. 1, used with components in FIG. 1, or a combination of the two.

Figure 7:
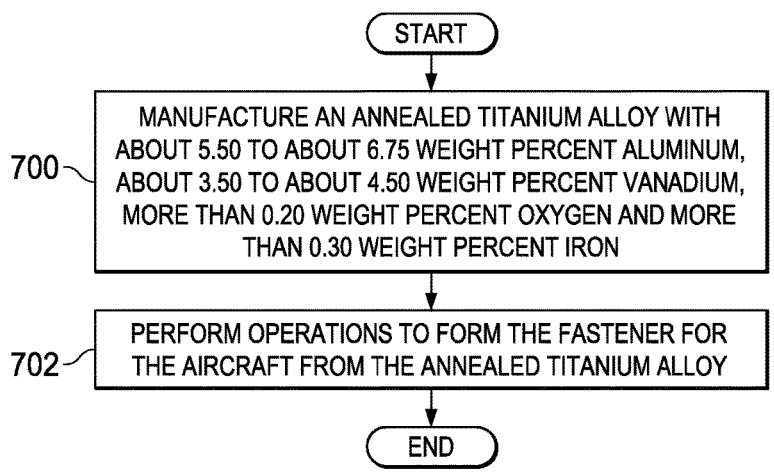
FIG. 7 is an illustration of a flowchart of a process for forming a fastener for an aircraft in accordance with an illustrative embodiment.

With reference now to FIG. 7, an illustration of a flowchart of a process for forming a fastener for an aircraft is depicted in accordance with an illustrative embodiment. The process illustrated in FIG. 7 may be implemented in manufacturing environment 100 to form fastener 106 for aircraft 109 in FIG. 1.

The process begins by manufacturing an annealed titanium alloy with about 5.50 to about 6.75 weight percent aluminum, about 3.50 to about 4.50 weight percent vanadium, more than 0.20 percent weight oxygen, and 0.30 percent weight iron (operation 700). For example, the annealed titanium alloy may have about 0.25 to about 0.50 weight percent oxygen and about 0.40 to about 0.80 weight percent iron in addition to the aforementioned aluminum and vanadium content. The annealed titanium alloy also may have about 0.005 to about 0.20 weight percent molybdenum and about 0.03 to about 0.15 weight percent chromium in some cases.

Next, the process performs operations to form the fastener for the aircraft from the annealed titanium alloy (operation 702), with the process terminating thereafter. For a fastener having a diameter of less than 0.625 inches, the fastener is formed such that the fastener has an ultimate tensile strength of at least 160 ksi and a shear strength of at least 95 ksi. For a fastener having a diameter of more than one inch, the fastener is formed such that the fastener has an ultimate tensile strength of at least 150 ksi and a shear strength of at least 90 ksi.

Figure 8:
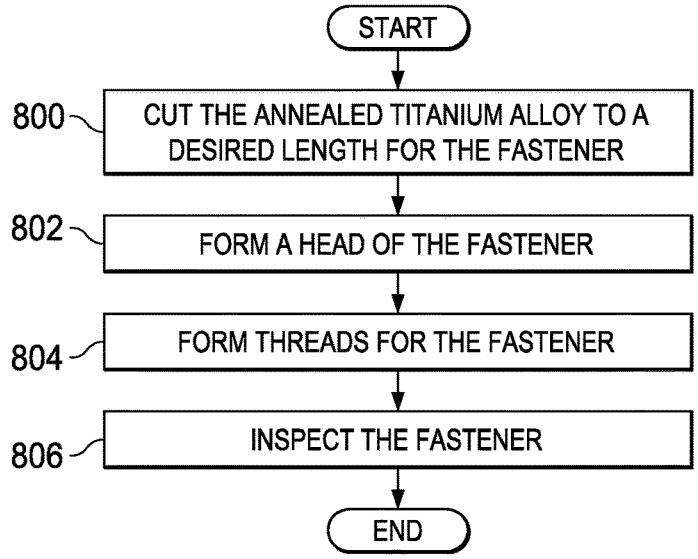
FIG. 8 is an illustration of a more detailed flowchart of a process for forming a fastener in accordance with an illustrative embodiment.

Turning to FIG. 8, an illustration of a more detailed flowchart of a process for forming a fastener is depicted in accordance with an illustrative embodiment. The process illustrated in FIG. 8 may be implemented in manufacturing environment 100 during operation 702 shown in FIG. 7 to form fastener 106 in FIG. 1. The fastener is formed directly from an annealed titanium alloy, without solution treating and aging the material.

The process begins by cutting the annealed titanium alloy to a desired length for the fastener (operation 800). Next, the process forms a head of the fastener (operation 802).

The process then forms threads for the fastener (operation 804). In operation 804, the process may include hot rolling the annealed titanium alloy to form the threads. The process inspects the fastener (operation 806), with the process terminating thereafter.

In some illustrative examples, the fastener may be cleaned, inspected, and altered at various times during the process. For instance, after the head of the fastener is formed, the titanium alloy may be cleaned, inspected, and then moved on to the next station for thread formation. In another illustrative example, the process may include additional steps such as an acid dip, grinding, coating, other processes, or a combination thereof.

The operations illustrated in FIG. 8 do not include a solution treat and age process for strengthening the fastener. Instead, the fastener achieves a desired ultimate tensile strength and shear strength by comprising only annealed titanium alloy with increased oxygen and iron content.

The processing temperature limit of the annealed titanium alloy is higher than with a solution treat and aged specimen. As a result, the operations may be performed on the annealed titanium alloy at a temperature up to about 1,400 degrees Fahrenheit to form the fastener. In some cases, even higher temperatures may be possible, depending on the particular implementation. These operations may be performed without altering the desired material properties of the annealed titanium alloy.

Figure 9:
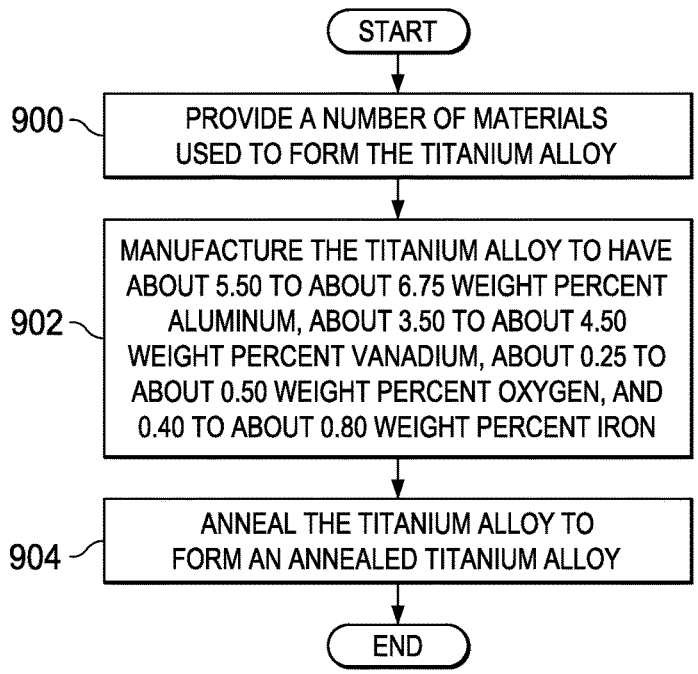
FIG. 9 is an illustration of a flowchart of a process for making a titanium alloy fastener stock in accordance with an illustrative embodiment.

Referring now to FIG. 9, an illustration of a flowchart of a process for making a titanium alloy fastener stock is depicted in accordance with an illustrative embodiment. The process illustrated in FIG. 9 may be implemented in manufacturing environment 100 to form fastener stock 104 shown in FIG. 1. In addition, the process illustrated in FIG. 9 may be used to form the annealed titanium alloy used to form fastener 106 as described in FIG. 8.

The process begins by providing a number of materials used to form the titanium alloy (operation 1100). Next, the process manufactures the titanium alloy to have about 5.50 to about 6.75 weight percent aluminum, about 3.50 to about 4.50 weight percent vanadium, about 0.25 to about 0.50 weight percent oxygen, and about 0.40 to about 0.80 weight percent iron (operation 902). In operation 902, the titanium alloy may be manufactured to have about 0.25 to about 0.30 weight percent oxygen, about 0.40 to about 0.60 percent weight iron, about 0.005 to about 0.20 weight percent molybdenum, and about 0.03 to about 0.15 weight percent chromium in some examples. This titanium alloy is an alpha-beta titanium alloy in this illustrative example.

During operation 902, several steps may be performed to complete ingot to bar processing to form the desired titanium alloy fastener stock. For example, at least one of ore beneficiation, $TiO_2$ chlorination, $TiCl_4$ distillation, Mg Reduction, sponge purification, comminution, blending of the sponge-scrap-alloy combination, compaction, variable arc re-melt, homogenization, various levels of conditioning, hot work, cold work, or other suitable steps may be performed.

Operation 902 may be performed with more scrap material than traditional aerospace Ti-6Al-4V that limits its oxygen and iron content. For example, during blending of the sponge-scrap-alloy combination, the titanium alloy may be manufactured using at least fifty percent titanium scrap material. In some cases, the titanium alloy may be manufactured using at least seventy percent titanium scrap material.

Next, the process anneals the titanium alloy to form an annealed titanium alloy (operation 904), with the process terminating thereafter. The annealing temperature may be between about 1,200 degrees and about 1,400 degrees Fahrenheit, depending on the particular implementation.

Prior to or after operation 904, the process may include steps such as hot rolling, conditioning, cold rolling, and others to form desired material properties for the titanium alloy. For instance, the titanium alloy may be hot rolled at a temperature in the alpha-beta phase field, between about 1,200 and about 1,400 degrees Fahrenheit, then annealed and conditioned. Thereafter, cold rolling may occur and the material once again may be annealed.

The process described in FIG. 9 forms fastener stock that has an ultimate tensile strength of at least 160 ksi and a shear strength of at least 95 ksi, depending on the thickness of the material. At least one of the ultimate tensile strength or the shear strength of the titanium alloy remains substantially the same as a thickness of the titanium alloy increases from about 1.0 inch to about 4.0 inches.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 10:
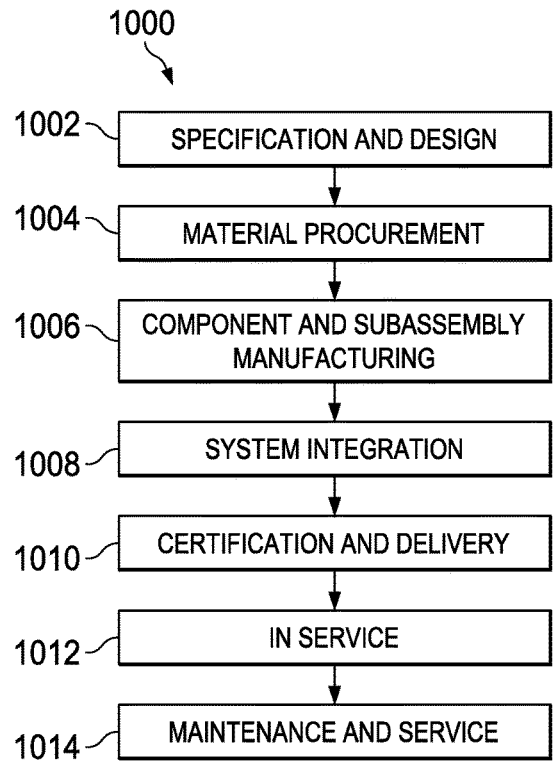
FIG. 10 is an illustration of an aircraft manufacturing and service method in the form of a block diagram in accordance with an illustrative embodiment.
Figure 11:
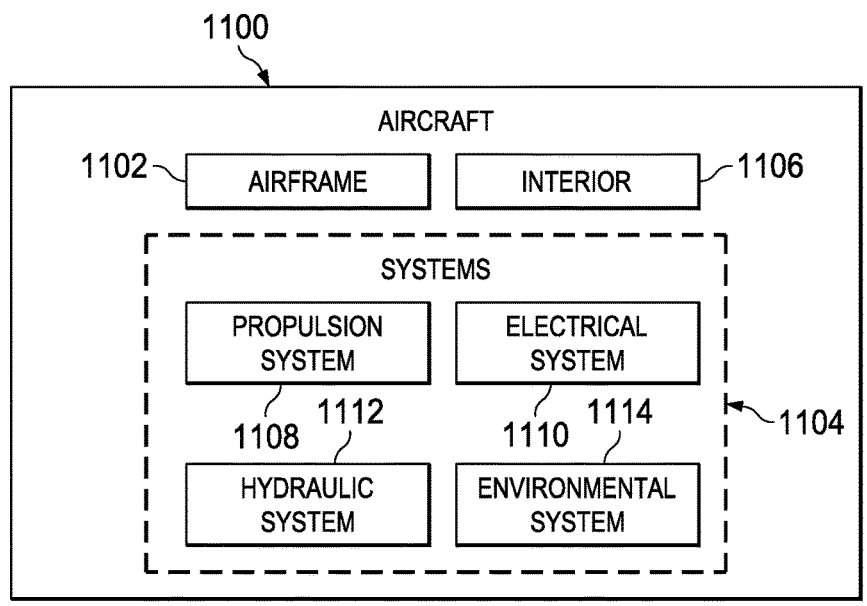
FIG. 11 is an illustration of an aircraft in the form of a block diagram in which an illustrative embodiment may be implemented.

The illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in the form of a block diagram in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in the form of a block diagram in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. In particular, fastener 106 formed from fastener stock 104 from FIG. 1 may be installed during aircraft manufacturing and service method 1000. For example, without limitation, fastener 106 with the increased amounts of oxygen and iron may be installed, fabricated, or reworked during at least one of component and subassembly manufacturing 1006, system integration 1008, routine maintenance and service 1014, or some other stage of aircraft manufacturing and service method 1000.

In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or a combination thereof. The use of a number of the different illustrative embodiments may substantially expedite the assembly, reduce the cost of aircraft 1100, or both.

Thus, the illustrative embodiments provide a method and apparatus for manufacturing titanium alloy 108. Further, the illustrative embodiments present a method and apparatus for forming fastener 106 from titanium alloy 108. An apparatus comprises fastener 106 used in aircraft 109. Fastener 106 includes titanium alloy 108 having more than 0.20 weight percent oxygen and 0.30 weight percent iron. In particular, fastener 106, made from titanium alloy 108, has about 5.50 to about 6.75 weight percent aluminum, about 3.50 to about 4.50 weight percent vanadium, about 0.25 to about 0.50 weight percent oxygen, and 0.40 to about 0.80 weight percent iron.

With the use of an illustrative embodiment, titanium alloy fasteners used in aircraft meet industry requirements, while eliminating expensive and time-consuming manufacturing steps. The composition of oxygen and iron within the illustrative embodiments achieves the required tensile strength and shear strength without using a solution treat and age process. As a result, significant cost savings may be realized.

Additionally, manufacturing fastener stock with higher levels of oxygen and iron allows manufacturers to use greater percentages of scrap material than before. With an illustrative embodiment, over fifty percent of the material used for the fastener stock may be scrap material. Recycling such scrap material reduces waste and achieves even greater cost savings.

The illustrative embodiments also provide fastener stock that may be manipulated and processed differently than solution treated and aged material. Since aging occurs at a temperature maximum of about 1,000 degrees Fahrenheit to achieve desired properties, subsequent operations performed on the material must occur under 1,000 degrees to avoid altering these properties. With an illustrative embodiment, operations may be performed on the material at a higher temperature. The processing temperature limit of an annealed material is much higher, allowing manufacturers to use various hot rolling and hot work processes, occurring at temperatures over 1,000 degrees, to form the fastener. As a result, fasteners may be manufactured more quickly and using more flexible processes than with solution treated and aged materials.

Further, the ultimate tensile strength and shear strength of an illustrative embodiment remains substantially the same as the thickness of the material increases. In this manner, the illustrative embodiments provide fasteners of varying diameters with similar strength profiles, well above industry criterion. As a result, fasteners made from the disclosed material, even those having a diameter of about one inch and above, are stronger and better suited for aerospace applications than some currently available solution treated and aged Ti-6Al-4V fasteners.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fastener comprising:
   a titanium alloy formed from between substantially 50 and 70 percent titanium scrap without using a solution treat and age process to have 5.50 to 6.75 weight percent aluminum, 4.01 to 4.50 weight percent vanadium, and to have an ultimate tensile strength of at least 160 ksi and a shear strength of at least 95 ksi when a diameter of the fastener is less than about 0.625 inches;
   wherein the titanium scrap comprises at least one of Ti-10V-2Fe-3Al scrap and Ti-5Al-5Mo-5V-3Cr scrap.

2. The fastener of claim 1, wherein the composition of oxygen and iron is 0.25 to 0.50 weight percent oxygen and 0.551 to 0.80 weight percent iron;
   wherein the composition of oxygen and iron within the fastener provides the ultimate tensile strength and the ultimate shear strength; and wherein a microstructure of the fastener has an equiaxed and elongated alpha phase in a transformed beta matrix.

3. The fastener of claim 2, wherein an oxygen composition increases an alpha phase strength and an iron composition increases a beta phase strength.

4. The fastener of claim 1, wherein the titanium alloy has about 0.005 to about 0.20 weight percent molybdenum and about 0.03 to about 0.15 weight percent chromium.

5. The fastener of claim 1, wherein an ultimate tensile strength of the titanium alloy remains substantially the same as a thickness of the titanium alloy increases from about 1.0 inch to about 4.0 inches.

6. A method for making a titanium alloy, the method comprising:
   manufacturing the titanium alloy from between substantially 50 and 70 percent titanium scrap without using a solution treat and age process to have about 5.50 to about 6.75 weight percent aluminum, about 4.01 to about 4.50 weight percent vanadium, and have an ultimate tensile strength of at least 160 ksi and a shear strength of at least 95 ksi when a diameter of the fastener is less than about 0.625 inches;
   wherein the titanium scrap comprises at least one of Ti-10V-2Fe-3Al scrap and Ti-5Al-5Mo-5V-3Cr scrap.

7. The method of claim 6, wherein manufacturing the titanium alloy comprises:
   manufacturing the titanium alloy to have a composition of oxygen and iron to be about 0.25 to about 0.50 weight percent oxygen, and about 0.551 to about 0.80 weight percent iron;
   wherein the composition of oxygen and iron within the fastener provides the ultimate tensile strength and the ultimate shear strength; and
   wherein the microstructure has an equiaxed and elongated alpha phase in a transformed beta matrix.

8. The method of claim 7,
   wherein an oxygen composition increases an alpha phase strength and an iron composition increases a beta phase strength.

9. The method of claim 6 further comprising:
   annealing the titanium alloy to form an annealed titanium alloy.

10. The method of claim 6, wherein manufacturing the titanium alloy comprises:
   manufacturing the titanium alloy such that at least one of an ultimate tensile strength or a shear strength of the titanium alloy remains substantially the same as a thickness of the titanium alloy increases from about 1.0 inch to about 4.0 inches.

11. A method for forming a fastener for an aircraft, the method comprising:
   annealing a titanium alloy from between substantially 50 and 70 percent titanium scrap to form a fastener stock;
   manufacturing a the fastener from the fastener stock with about 5.50 to about 6.75 weight percent aluminum, about 4.01 to about 4.50 weight percent vanadium; and
   performing operations to form the fastener for the aircraft from the titanium alloy;
   wherein the titanium scrap comprises at least one of Ti-10V-2Fe-3Al scrap and Ti-5Al-5Mo-5V-3Cr scrap.

12. The method of claim 11, wherein
   the composition of oxygen and iron within the fastener provides the ultimate tensile strength and the ultimate shear strength; and
   wherein the microstructure has an equiaxed and elongated alpha phase in a transformed beta matrix.

13. The method of claim 11, wherein manufacturing the titanium alloy comprises:
   manufacturing the titanium alloy with about 0.005 to about 0.20 weight percent molybdenum and about 0.03 to about 0.15 weight percent chromium;
   wherein an oxygen composition increases an alpha phase strength and an iron composition increases a beta phase strength.

14. The method of claim 11, wherein forming the fastener comprises:
   forming the fastener directly from the titanium alloy such that the fastener has an ultimate tensile strength of at least 160 ksi and a shear strength of at least 95 ksi when a diameter of the fastener is less than about 0.625 inches.

15. The method of claim 11, wherein performing the operations to form the fastener comprises:
   cutting the titanium alloy to a desired length for the fastener;
   forming a head of the fastener;
   forming threads for the fastener; and
   inspecting the fastener.

16. The method of claim 11 further comprising:
   performing the operations on the titanium alloy at a temperature between about 1,000 degrees and about 1,400 degrees Fahrenheit to form the fastener.

* * * * *